(12) United States Patent
Horie

(10) Patent No.: US 9,052,785 B2
(45) Date of Patent: Jun. 9, 2015

(54) POSITION DETECTING DEVICE, DISPLAY APPARATUS, AND PORTABLE APPARATUS

(75) Inventor: Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 206 days.

(21) Appl. No.: 13/330,391

(22) Filed: Dec. 19, 2011

(65) Prior Publication Data
US 2012/0306824 A1 Dec. 6, 2012

(30) Foreign Application Priority Data
Jun. 6, 2011 (JP) .................................. 2011-126768

(51) Int. Cl.
G06F 3/03 (2006.01)
G06F 3/046 (2006.01)
G06F 3/044 (2006.01)
G06F 3/0354 (2013.01)

(52) U.S. Cl.
CPC ............ G06F 3/044 (2013.01); G06F 3/03545 (2013.01); *G06F 2203/04103* (2013.01)

(58) Field of Classification Search
CPC .................................. G06F 3/03; G06F 3/046
USPC ............ 178/18.03–18.08; 345/173, 174, 179; 361/816; 428/704
See application file for complete search history.

(56) References Cited

U.S. PATENT DOCUMENTS

| | | | |
|---|---|---|---|
| 5,734,130 A * | 3/1998 | Baker | 178/18.07 |
| 7,907,130 B2 * | 3/2011 | Ely | 345/179 |
| 7,956,851 B2 * | 6/2011 | Vos | 345/174 |
| 8,149,220 B2 * | 4/2012 | Fukushima et al. | 345/173 |
| 8,217,911 B2 * | 7/2012 | Gettemy et al. | 345/173 |
| 8,363,034 B2 * | 1/2013 | Tanimizu et al. | 345/174 |

(Continued)

FOREIGN PATENT DOCUMENTS

| | | |
|---|---|---|
| CN | 101329607 A | 12/2008 |
| CN | 202904549 U | 4/2013 |

(Continued)

OTHER PUBLICATIONS

H.H. Helms Jr. and Edmond Adams, Sendust SheetProcessing Techniques and MAgnetic Properties, 1964, Journal of APplied Physics 35, 871.*

(Continued)

*Primary Examiner* — Kent Chang
*Assistant Examiner* — Herbert L Hagemeier
(74) *Attorney, Agent, or Firm* — Seed IP Law Group PLLC

(57) ABSTRACT

A position detecting device is disclosed for use with a position indicator. The position detecting device includes a coil substrate, a magnetic path material, and a shield material. A coil for generating an alternating magnetic field for electromagnetic coupling with the position indicator is disposed on the coil substrate. The magnetic path material is composed of a material having such permeability as not to disturb direct current magnetic flux but to form a magnetic path for the alternating magnetic field generated by the coil, and having predetermined electrical resistance for suppressing flow of an eddy current in order to enhance the material's performance as a magnetic path. The shield material is a non-magnetic substance that does not disturb the direct current magnetic flux due to the direct current magnetic field and that has electrical conductivity for generating an eddy current based on the alternating magnetic field.

42 Claims, 9 Drawing Sheets

(56) References Cited

U.S. PATENT DOCUMENTS

2009/0160790 A1    6/2009    Fukushima et al.
2010/0188832 A1*   7/2010    Free et al. .................... 361/816
2011/0033732 A1*   2/2011    Aramaki et al. ............. 428/704

FOREIGN PATENT DOCUMENTS

JP       10049287 A  *  2/1998  .............. G06F 3/03
JP     2009003796 A    1/2009

OTHER PUBLICATIONS

Japanese Office Action dated Apr. 23, 2013, for corresponding JP Application No. 2011-126768, 3 pages.

Office Action, dated Sep. 15, 2014, for corresponding Chinese Application No. 201210029847.3, 6 pages.

* cited by examiner

F I G . 1
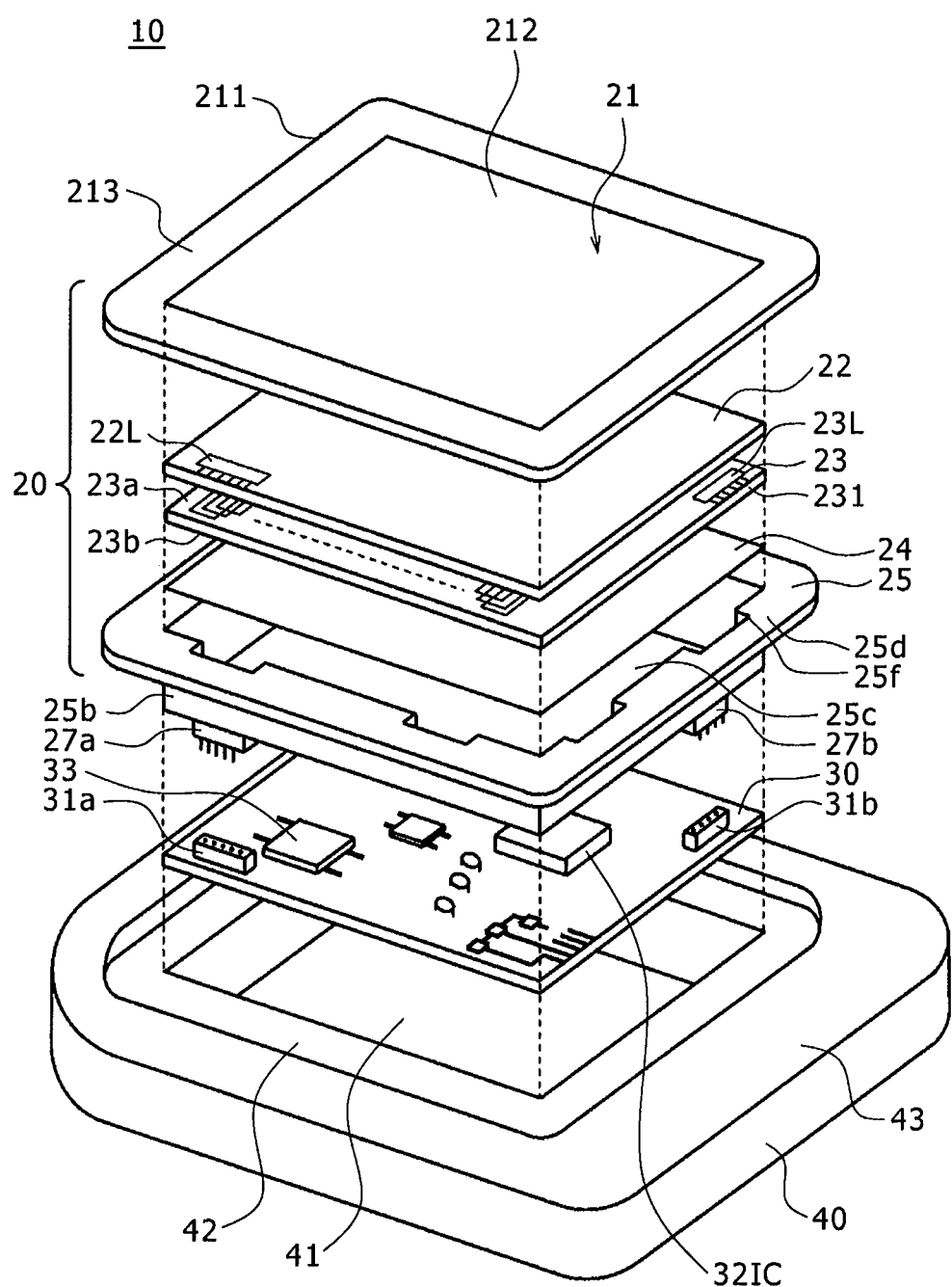

FIG. 5

| | MAGNETIC PATH PLATE OF RELATED ART | MAGNETIC PATH MATERIAL 24 OF EMBODIMENT | SHIELD MATERIAL 25 OF EMBODIMENT |
|---|---|---|---|
| PERMEABILITY [H/m] | HIGH ($\mu$=10,000) | LOW ($\mu$=100) | LOW ($\mu$≒1) |
| ELECTRICAL RESISTANCE | LOW (0.1Ω) | HIGH (100kΩ) | LOW |
| EFFECT ON DC MAGNETIC FIELD (GEOMAGNETISM) | BIASING DUE TO MAGNETIC PATH PLATE | TRANSMISSION THROUGH MAGNETIC PATH MATERIAL 24 (INFLUENCE IS ABSENT) | TRANSMISSION THROUGH SHIELD MATERIAL 25 (INFLUENCE IS ABSENT) |
| EFFECT ON AC MAGNETIC FIELD | MAGNETIC PATH PERFORMANCE IS HIGH DUE TO HIGH PERMEABILITY | MAGNETIC PATH PERFORMANCE IS LOW | SHIELD EFFECT DUE TO EDDY CURRENT IS LARGE |

POSITION DETECTING DEVICE, DISPLAY APPARATUS, AND PORTABLE APPARATUS

CROSS-REFERENCE TO RELATED APPLICATION

The present application claims priority under 35 U.S.C. §119(a) of Japanese Application No. 2011-126768, filed Jun. 6, 2011, which application is incorporated herein by reference in its entirety.

BACKGROUND OF THE INVENTION

1. Technical Field

This invention relates to a position detecting device that is used together with a position indicator to detect a position indicated by the position indicator. Furthermore, this invention relates to a display apparatus including a position detecting device, and a portable apparatus including a position detecting device.

2. Description of the Related Art

The position detecting device to detect a position indicated by a position indicator, such as a finger or a pen, is well known. As position detecting systems used in the position detecting devices, various kinds of systems such as the resistive film system, the electromagnetic induction system, and the capacitive system are known. An example of the position detecting device that uses the electromagnetic induction system is described in Japanese Patent Laid-open No. 2009-3796 (referred to as Patent Document 1).

Specifically, in the position detecting device described in Patent Document 1, as shown in FIG. 10, a sensor substrate 3 and a magnetic path plate 4 are disposed between an upper case 1 and a lower case 2. The sensor substrate 3 has coils 5 in which an X-axis direction loop coil group (not shown) and a Y-axis direction loop coil group are disposed on both surfaces of the sensor substrate 3.

This position detecting device is used together with a position indicator 6. The position indicator 6 includes a resonant circuit composed of a coil 6L and a capacitor 6C.

In this position detecting device, each loop coil of the X-axis direction loop coil group and the Y-axis direction loop coil group of the coils 5 is selected by a selection circuit (not shown) according to a predetermined procedure. To the loop coil selected by the selection circuit, a predetermined alternating signal is supplied for a predetermined time. After the predetermined time has elapsed, the supply of the alternating signal to the selected loop coil is stopped and the loop coil is switched to the signal receiving state.

During the predetermined time when the alternating signal is supplied to the loop coil, an electromagnetic wave (alternating magnetic field) is generated from the loop coil and the alternating magnetic field is supplied to the resonant circuit of the position indicator 6. Thus, energy is stored in the resonant circuit.

After the supply of the alternating signal to the selected loop coil is stopped and the state is switched to the signal receiving state, an electromagnetic wave is transmitted from the position indicator 6 to the coils 5 based on the energy stored in the resonant circuit of the position indicator 6. Therefore, in the position detecting device, reception of the electromagnetic wave from the position indicator 6 can be sensed by monitoring the signal from the selected loop coil of the coils 5.

In the above-described manner, transmission and reception of the electromagnetic wave are performed between the coils 5 on the sensor substrate 3 and the position indicator 6. Furthermore, through selection of the loop coil by the selection circuit according to a predetermined procedure and transmission and reception of the electromagnetic wave between the loop coil and the position indicator 6, the position indicated by the position indicator 6 is determined.

Regarding the electromagnetic wave transmitted and received in the above-described manner, the magnetic path plate 4 forms a magnetic path for the alternating magnetic field generated by the coils 5. Accordingly, the magnetic path plate 4 prevents the spread of the generated magnetic flux, to thereby enhance the detection sensitivity of the position detecting device to the position indicator 6. Furthermore, the magnetic path plate 4 has a function to prevent an alternating magnetic field from radiating to the outside of the position detecting device and to prevent an electromagnetic wave from outside of the position detecting device from mixing in as noise with the electromagnetic wave transmitted and received in the above-described manner.

In other words, the magnetic path plate 4 is provided in order to effectively form a magnetic path for the alternating magnetic field. For this purpose, currently a material having high permeability, such as an amorphous metal, is used.

FIG. 11 shows a magnetic path formed when an amorphous metal is used as the material having high permeability for the magnetic path plate 4. In FIG. 11, the magnetic path plate 4 is composed of a magnetic substance of high permeability, such as an amorphous metal. The magnetic path plate 4 is composed of an amorphous metal whose permeability is as high as 10000 (H/m), for example, and therefore magnetic flux (alternating magnetic flux) generated due to the alternating signal supplied to the coils 5 effectively forms a magnetic path 4a in the magnetic path plate 4.

The amorphous metal has extremely low electrical resistance and therefore an eddy current is generated therein based on the magnetic flux applied to the magnetic path plate 4. The eddy current acts to cancel the applied magnetic field. However, even in view of the demerit associated with generation of the eddy current, the amorphous metal having high permeability exerts high performance as a magnetic path plate as a whole. Thus, an amorphous metal has been used to form a magnetic path plate for a position detecting device.

BRIEF SUMMARY

The above-described position detecting device in the related art has been used in homes as a coordinate input device, which is driven by a household (domestic) power supply. Therefore, the magnetic path plate has been required to have a function to enhance the degree of electromagnetic coupling between the position detecting device and the position indicator. On the other hand, in recent years, the position detecting device is incorporated in portable apparatuses such as a portable terminal (e.g., a portable phone), and is used also as an indication input device. Among portable terminals such as cellular phone terminals are terminals that have a built-in geomagnetic sensor and can detect the orientation. For example, when route guidance or the like is performed with a map displayed on the display screen of the portable terminal, the geomagnetic sensor detects the orientation of the terminal at the present position and controls the direction of the map being displayed on the display screen, to thereby facilitate the map guidance.

However, in the portable terminal having this kind of built-in geomagnetic sensor, it is found that possibly the orientation cannot be correctly detected if a position detecting device of the electromagnetic induction system, in which the above-described magnetic path plate of the related art is used, is employed as a device for receiving user indication input.

Specifically, the geomagnetic sensor is formed of, for example, a Hall element as an element that detects the output voltage depending on the direction of the DC (direct current) magnetic field, which is due to the geomagnetism traveling from the north magnetic pole side toward the south magnetic pole side. However, if the magnetic path plate 4 of high permeability exists near the geomagnetic sensor, the DC magnetic flux due to the DC magnetic field of the geomagnetism is often so biased to pass through the magnetic path plate 4 as its magnetic path. Alternatively, the DC magnetic flux is often so biased to be attracted to the magnetic path plate 4. As a result, the direction of incidence of the geomagnetism on the geomagnetic sensor changes, to possibly prevent the geomagnetic sensor from correctly detecting the orientation.

Regarding this difficulty, a further detailed description is shown in FIG. 12. FIG. 12 shows how the geomagnetism that should be detected by a geomagnetic sensor 8 is affected by the magnetic path plate 4. For example, in a sensor substrate 3 including coils 5, which is housed in a position detecting device, the geomagnetic sensor 8 formed of a Hall element is disposed on the side of the sensor surface opposed to the side of the sensor surface, on which a position is indicated by the position indicator 6, with the magnetic path plate 4 of high permeability interposed between the sensor surface and the geomagnetic sensor 8.

FIG. 12 is based on the assumption that the DC magnetic flux due to the geomagnetism extends in the direction from the left to the right. If the magnetic path plate 4 having high permeability does not exist in the vicinity, the DC magnetic flux due to the geomagnetism is incident on the geomagnetic sensor 8 without any distortion, as shown in dotted-line arrows 9. This allows the geomagnetic sensor 8 to correctly detect the direction of the geomagnetism.

However, if the magnetic path plate 4 of high permeability exists in the vicinity, the magnetic flux due to the geomagnetism is so biased as to be attracted toward the magnetic path plate 4 of high permeability, as shown in curves 9a. Therefore, the incident path of the DC magnetic flux due to the geomagnetism to the geomagnetic sensor 8 is biased from the original incident path. This precludes the geomagnetic sensor 8 from correctly detecting the orientation of the geomagnetism.

There is a desire to provide a position detecting device of the electromagnetic induction system, configured to favorably form a magnetic path for an alternating magnetic field to thereby ensure a favorable electromagnetic coupling relationship between the position detecting device and a position indicator, while at the same time having transmissibility for DC magnetic flux based on the DC magnetic field without biasing it to thereby prevent the biased DC magnetic flux from negatively impacting the performance of a magnetic sensor configured to detect a DC magnetic field such as the geomagnetism.

The term "transmissibility" of a magnetic path material, as used herein, refers to a characteristic that DC magnetic flux based on a DC magnetic field is not disturbed by a magnetic path material even when the magnetic path material is disposed in the DC magnetic field.

According to an aspect of the present invention, there is provided a position detecting device used together with a position indicator. The position detecting device includes a coil substrate, on which a coil for generating an alternating magnetic field for electromagnetic coupling with the position indicator is disposed. The position detecting device also includes a magnetic path material composed of a material that forms a magnetic path for the alternating magnetic field generated by the coil but has predetermined permeability so as to have no influence on DC magnetic flux due to a DC magnetic field such as the geomagnetism. Furthermore, the magnetic path material has predetermined electrical resistance for suppressing passage of an electrical current, to thereby reduce loss due to an eddy current, in order to compensate for the deterioration of performance as the magnetic path, which is caused by the predetermined permeability so set as to have no influence on the DC magnetic flux due to the DC magnetic field. The position detecting device further includes a shield material used in combination with the magnetic path material. The shield material is made of a non-magnetic substance that has no influence on the DC magnetic flux due to the DC magnetic field and has electrical conductivity so that an eddy current may be generated based on the alternating magnetic field. The magnetic path material and the shield material are disposed on (or near) the side of a second surface of the coil substrate, which is opposite to a first surface of the coil substrate on which the position indicator is applied, in such a relationship that the magnetic path material is disposed between the second surface and the shield material.

According to another aspect of the present invention, there is provided a display apparatus used together with a position indicator, wherein the display apparatus includes a coil substrate, a display device, a magnetic path material, and a shield material. A coil for generating an alternating magnetic field for electromagnetic coupling with the position indicator is disposed on the coil substrate. The display device is configured to be disposed on (or near) a side of a first surface of the coil substrate, to which the position indicator is opposed. The magnetic path material is composed of a material having such permeability as not to disturb DC magnetic flux due to a DC magnetic field. The material having such permeability forms a magnetic path for the alternating magnetic field generated by the coil, and also has predetermined electrical resistance for suppressing flow of an eddy current generated due to the alternating magnetic field generated by the coil, in order to enhance the characteristic of the magnetic path material as a magnetic path. The shield material is formed of a non-magnetic substance that does not disturb the DC magnetic flux due to the DC magnetic field, and has electrical conductivity for generating an eddy current based on the alternating magnetic field. The shield material has a wall part for housing the coil substrate, the magnetic path material and the display device. The magnetic path material and the shield material are disposed on a side of a second surface of the coil substrate, which is opposite to the first surface of the coil substrate, in such a relationship that the magnetic path material is disposed between the second surface and the shield material.

According to a further aspect of the present invention, there is provided a portable apparatus used together with a position indicator. The portable apparatus includes a geomagnetic sensor, a coil substrate, a display device, a magnetic path material and a shield material. A coil for generating an alternating magnetic field for electromagnetic coupling with the position indicator is disposed on the coil substrate. The display device is disposed on a side of a first surface of the coil substrate, to which the position indicator is opposed. The magnetic path material is composed of a material having such permeability as not to disturb DC magnetic flux due to a DC magnetic field to be detected by the geomagnetic sensor. The material having such permeability forms a magnetic path for the alternating magnetic field generated by the coil, and also has predetermined electrical resistance for suppressing flow of an eddy current generated due to the alternating magnetic field generated by the coil in order to enhance the characteristic of the magnetic path material as a magnetic path. The shield material is formed of a non-magnetic substance that does not disturb the DC magnetic flux due to the DC magnetic field to be detected by the geomagnetic sensor, and has electrical conductivity for generating an eddy current based on the alternating magnetic field. The shield material has a wall part for housing the coil substrate, the magnetic path material and the display device. The magnetic path material and the shield material are disposed on or near a side of a second surface of the coil substrate, which is opposite to the first surface of the coil substrate, in such a relationship that the magnetic path material is disposed between the second surface and the shield material.

In the position detecting device of the related art, a magnetic path plate of high permeability is used, which acts on not only alternating magnetic flux but also on DC magnetic flux.

In contrast, in one aspect of the present invention, the magnetic path material provided on or near the side of the second surface of the coil substrate, which is opposite to the first surface to which the position indicator is opposed, is composed of a material having such predetermined permeability as to have no influence on DC magnetic flux due to a DC magnetic field such as the geomagnetism. In other words, the permeability possessed by the magnetic path material is so set that, even when a magnetic sensor for detecting a DC magnetic field such as the geomagnetism is disposed near the magnetic path material, the detection error of the magnetic sensor will not exceed an unallowable value.

Therefore, the direction of the magnetic flux of the DC magnetic field such as the geomagnetism is prevented from being biased, even when the magnetic path material exists. Thus, even when a geomagnetic sensor is disposed near the magnetic path material included in the position detecting device, the geomagnetic sensor can detect the correct orientation.

On the other hand, with the magnetic path material having such transmissibility as not to substantially distort the DC magnetic flux due to the DC magnetic field such as the geomagnetism, i.e., with the magnetic path material having the permeability that is so set as to have no adverse effect on the DC magnetic field such as the geomagnetism, the following problem occurs with respect to the alternating magnetic field generated by the coil for generating the alternating magnetic field for electromagnetic coupling with the position indicator. Specifically, if the permeability of the magnetic path material is set so as to have no substantial influence on the DC magnetic flux due to the DC magnetic field such as the geomagnetism, for example, a value that is about two orders of magnitude smaller than the permeability of an amorphous metal or the like is to be used as the permeability of the magnetic path material. With the magnetic path material having such a small value of permeability, the influence of the eddy current generated in the magnetic path material due to the alternating magnetic field cannot be ignored if the electrical resistance of the magnetic path material is low.

That is, a large eddy current is generated if the electrical resistance of the magnetic path material is low, and the eddy current makes it harder for magnetic flux due to the alternating magnetic field to pass through the magnetic path material. As a result, the alternating magnetic flux electromagnetically coupled with the position indicator via the magnetic path formed in the magnetic path material will be suppressed. Accordingly, in view of the low permeability of the magnetic path material, the electromagnetic coupling between the position detecting device and the position indicator becomes weak, which possibly causes lowering of the sensor sensitivity of the position detecting device.

Therefore, in one aspect of the present invention, current flow in the magnetic path material is suppressed, i.e., generation of an eddy current is suppressed through increase in the electrical resistance, so that the alternating magnetic field generated by the coil for generating the alternating magnetic field for electromagnetic coupling with the position indicator is allowed to be sufficiently electromagnetically coupled with the position indicator via the magnetic path formed in the magnetic path material. In this manner, the eddy current generated in the magnetic path material due to the alternating magnetic field is suppressed, to thereby compensate for the deterioration of the sensor sensitivity of the position detecting device due to the low permeability of the magnetic path material. This serves to ensure a desired sensor sensitivity, even when the magnetic path material of low permeability is used in order to achieve transmissibility for the DC magnetic field such as the geomagnetism.

If the material having a predetermined permeability and a predetermined electrical resistance is used as the magnetic path material so that DC magnetic flux due to a DC magnetic field such as the geomagnetism may be prevented from being adversely affected while a sufficient magnetic path for the alternating magnetic field generated by the coil for generating the alternating magnetic field for electromagnetic coupling with the position indicator is ensured as described above, it is possible that the alternating magnetic field generated by the coil for generating the alternating magnetic field for electromagnetic coupling with the position indicator leaks to the outside of the position detecting device.

In view of this potential problem, in one aspect of the present invention, the shield material is provided to be used in combination with the magnetic path material. The shield material is made of a non-magnetic substance having no influence on the DC magnetic flux due to the DC magnetic field such as the geomagnetism, i.e., having transmissibility for the DC magnetic flux due to the DC magnetic field, and also having electrical conductivity to generate an eddy current based on the alternating magnetic field. Specifically, the alternating magnetic field, which may leak from the magnetic path material to the outside, generates an eddy current in the shield material and the generated eddy current acts to cancel the alternating magnetic field that may have leaked from the magnetic path material to the outside. Therefore, while transmissibility for the DC magnetic flux due to the DC magnetic field such as the geomagnetism is ensured, leakage of the alternating magnetic field generated by the coil for generating the alternating magnetic field for electromagnetic coupling with the position indicator from the position detecting device to the outside is blocked. Furthermore, entry of an alternating magnetic field as external noise from outside of the position detecting device can also be blocked by the eddy current, which is generated in the shield material based on the alternating magnetic field of the external noise.

According to one aspect of the present invention, it is possible to substantially avoid influence on DC magnetic flux due to a DC magnetic field such as the geomagnetism, i.e., to ensure transmissibility for the DC magnetic flux. Meanwhile, it is possible to ensure an effective magnetic path for the alternating magnetic field generated by the coil for generating the alternating magnetic field for electromagnetic coupling with the position indicator through increase in the electrical resistance of the magnetic path. These features can provide a position detecting device of the electromagnetic induction system that ensures desired sensor sensitivity for the position detecting device, and is free from undesirable bias to the direction of the DC magnetic flux to be detected by a magnetic sensor for detecting a DC magnetic field such as the geomagnetism, even when the magnetic sensor is disposed near the position detecting device.

BRIEF DESCRIPTION OF THE SEVERAL VIEWS OF THE DRAWINGS

FIG. 1 is an exploded view of an embodiment of a portable apparatus including a position detecting device according to a first embodiment of this invention;

FIG. 5 is a diagram for explaining and comparing a magnetic path material used in the position detecting device of the first embodiment and a magnetic path plate of Patent Document 1;

DETAILED DESCRIPTION

A position detecting device, display apparatus, and portable apparatus according to embodiments of the present invention will be described below with reference to the drawings.

First Embodiment

Figure 2:
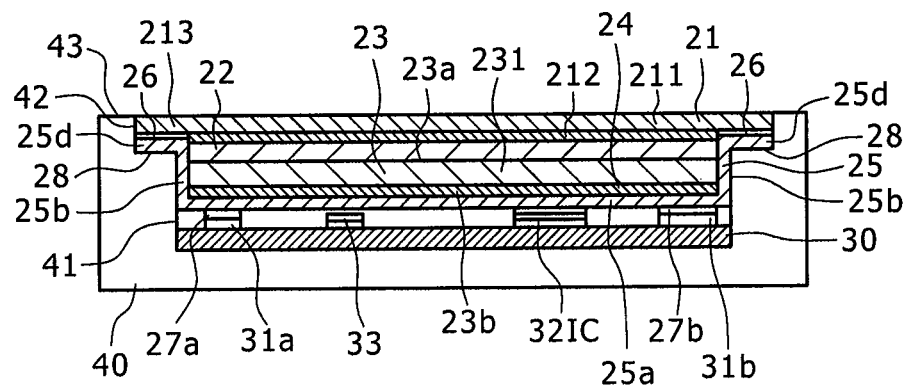
FIG. 2 is a sectional view of the portable apparatus of FIG. 1.

FIG. 1 is an exploded configuration diagram of an embodiment of a portable apparatus, such as a portable terminal, including a position detecting device according to a first embodiment of the present invention. The portable terminal of this embodiment also serves as a display apparatus according to an embodiment of the present invention. FIG. 2 is a sectional view of the portable apparatus of this embodiment when assembled.

As shown in FIG. 1, a portable terminal 10 of this embodiment includes a position detecting device 20 formed as a module or unit, a printed wiring board (motherboard) 30, and a chassis 40.

The position detecting device 20 includes a first sensor substrate 21, a liquid crystal display (LCD) substrate 22 as an example of a display device, a second sensor substrate 23, a magnetic path material 24, and a shield material 25.

In this example, the first sensor substrate 21 is a sensor of the capacitive system and is configured by providing a transparent electrode group 212 formed of, for example, an indium tin oxide (ITO) film on the back surface of a transparent substrate 211 serving also as a protective plate of the position detecting device 20, as shown in FIG. 2. The transparent substrate 211 is formed of a glass substrate, for example.

Figure 3:
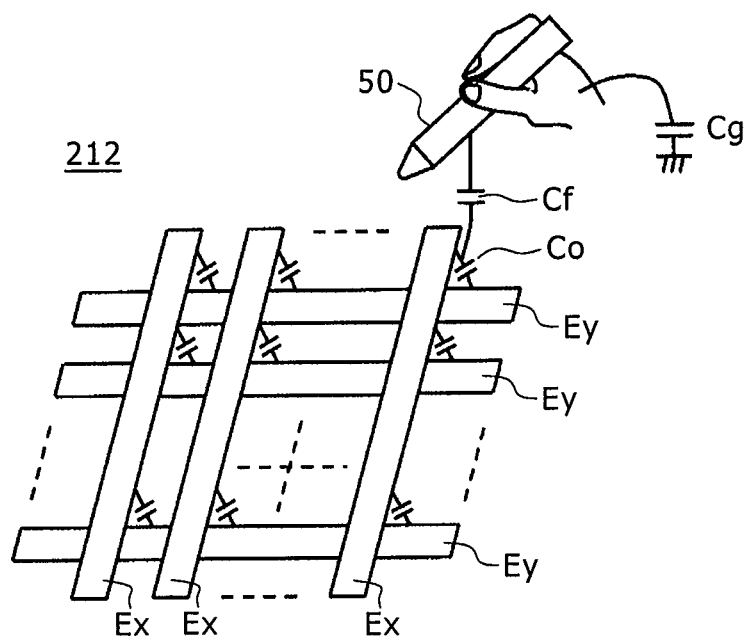
FIG. 3 is a diagram for explaining a sensor for position detection, which may be used in the portable apparatus of the example of FIG. 1.

FIG. 3 shows a schematic configuration of a transparent electrode group when the first sensor substrate 21 has a configuration of a sensor part of the cross-point capacitive coupling system. Specifically, in the first sensor substrate 21 of this example, the transparent electrode group 212 is configured as follows. As shown in FIG. 3, on the back surface of a transparent substrate (not shown in FIG. 3) serving as the indication input surface, plural upper transparent electrodes Ex and plural lower transparent electrodes Ey are disposed along the X-axis direction (horizontal direction) and the Y-axis direction (vertical direction), for example, which are orthogonal to each other. In addition, in the area of each cross point between the upper transparent electrode Ex and the lower transparent electrode Ey, an insulating material is disposed between the upper transparent electrode Ex and the lower transparent electrode Ey, and thus these electrodes are electrically insulated from each other. Due to this configuration, predetermined capacitance Co (fixed capacitance) is formed at the overlapping point (cross point) between the upper transparent electrode Ex and the lower transparent electrode Ey.

Furthermore, as shown in FIG. 3, at the position where a position indicator 50, such as a pen held by a user for position indication or a finger of the user, is brought close to or into contact with the indication input surface, capacitance Cf is formed between the transparent electrodes Ex and Ey at this position and the position indicator 50. In addition, the position indicator 50 is connected to ground via predetermined capacitance Cg through the human body. As a result, due to the capacitances Cf and Cg, the amount of movement of the charge between the upper transparent electrode Ex and the lower transparent electrode Ey at the position indicated by the position indicator 50 changes. In the position detecting device of the cross-point capacitive coupling system, this change in the amount of charge movement is detected at each cross point and, therefore, plural positions indicated by the position indicators 50 on the indication input surface can be simultaneously specified. The first sensor substrate 21 is electrically connected to the printed wiring board 30, although not shown in the diagram.

As shown in FIG. 1, the area in which the transparent electrode group 212 is provided, which serves as the detection area for indication input, is smaller than the total area of the transparent substrate 211. Therefore, the transparent substrate 211 has a frame part 213 around the area in which the transparent electrode group 212 is provided. The frame part 213 serves as a flange part for bonding when the position detecting device 20 is housed in the chassis 40, as will be described below.

The LCD substrate 22 is provided on the back surface side (lower side) of the transparent substrate 211 of the first sensor substrate 21. The LCD substrate 22 includes an LCD part and a display drive circuit part, although not shown in the diagram. As shown in FIG. 1, a lead part 22L for connecting the display drive circuit part to an external circuit (printed wiring board 30) is formed on the LCD substrate 22.

The second sensor substrate 23 is provided under the LCD substrate 22. The second sensor substrate 23 of this example has a configuration of a sensor of the electromagnetic induction system. The configuration of the second sensor substrate 23 will be described with reference to FIG. 4. A pen 51 as a position indicator used together with a sensor part of the electromagnetic induction type forming the second sensor substrate 23 has a built-in resonant circuit composed of a coil 51L and a capacitor 51C connected in parallel to this coil 51L, as shown in FIG. 4.

Figure 4:
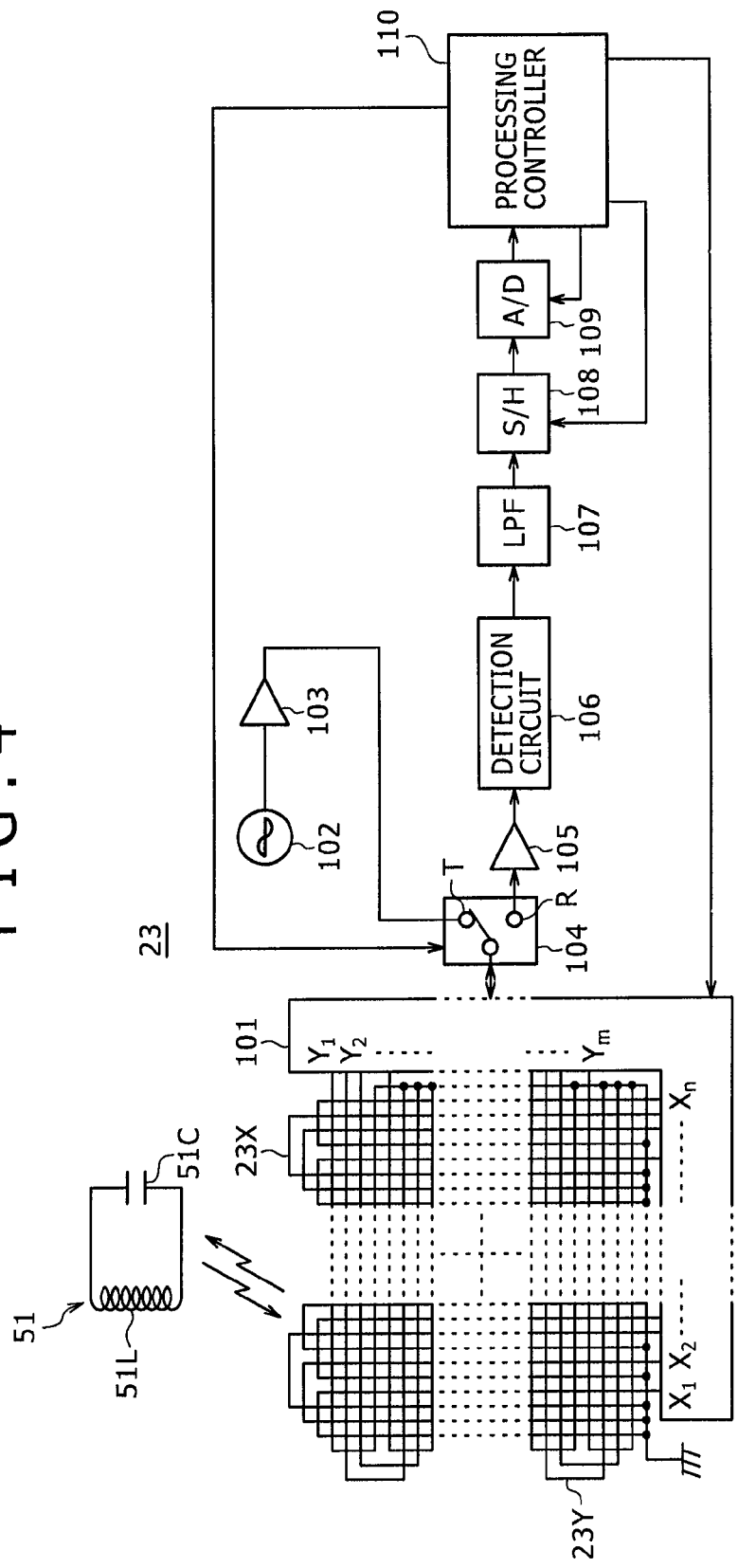
FIG. 4 is another diagram for explaining a sensor for position detection, which may be used in the portable apparatus of the example of FIG. 1.

In the second sensor substrate 23, on a wiring board 231, an X-axis direction loop coil group 23X and a Y-axis direction loop coil group 23Y are disposed on the respective (two) surfaces of the wiring board 231 and the loop coils are so disposed as to be superimposed on each other as shown in FIG. 4. Therefore, the second sensor substrate 23 forms the coil substrate. Each of the loop coil groups 23X and 23Y is composed of plural rectangular loop coils. In this example, n loop coils are disposed in the X-axis direction and m loop coils are disposed in the Y-axis direction.

The respective loop coils of the loop coil group 23X are so disposed as to be juxtaposed at equal intervals and to sequentially overlap with each other in the horizontal direction (X-axis direction) of the detection area for detecting the pen 51. Furthermore, the respective loop coils of the loop coil group 23Y are so disposed as to be juxtaposed at equal intervals and to sequentially overlap with each other in the vertical direction (Y-axis direction) of the detection area.

A sensor circuit part is provided on the second sensor substrate 23. This sensor circuit part includes a selection circuit 101, an oscillator 102, a current driver 103, a transmission/reception switch circuit 104, a reception amplifier 105, a detection circuit 106, a low-pass filter 107, a sample hold circuit 108, an analog to digital (A/D) conversion circuit 109, and a processing controller 110.

The X-axis direction loop coil group 23X and the Y-axis direction loop coil group 23Y are connected to the selection circuit 101. The selection circuit 101 sequentially selects one loop coil of two loop coil groups 23X and 23Y in accordance with a control order from the processing controller 110.

The oscillator 102 generates an AC (alternative current) signal of a frequency f0. The AC signal is supplied to the current driver 103 and converted to a current and thereafter sent out to the transmission/reception switch circuit 104. The transmission/reception switch circuit 104 switches, at every predetermined time, the connection destination (i.e., the transmission-side terminal T, or the reception-side terminal R), to which the loop coil selected by the selection circuit 101 is connected under the control of the processing controller 110. The current driver 103 is connected to the transmission-side terminal T and the reception amplifier 105 is connected to the reception-side terminal R.

Therefore, during transmission, the AC signal from the current driver 103 is supplied to the loop coil selected by the selection circuit 101 via the transmission-side terminal T of the transmission/reception switch circuit 104. During reception, an induced voltage generated across the loop coil selected by the selection circuit 101 is supplied to the reception amplifier 105 via the selection circuit 101 and the reception-side terminal R of the transmission/reception switch circuit 104, to be amplified and sent out to the detection circuit 106.

The signal detected by the detection circuit 106 is supplied to the A/D conversion circuit 109 via the low-pass filter 107 and the sample hold circuit 108. The A/D conversion circuit 109 converts the analog signal to a digital signal and supplies the digital signal to the processing controller 110.

The processing controller 110 carries out control for position detection. Specifically, the processing controller 110 controls selection of the loop coil in the selection circuit 101, signal switch control in the transmission/reception switch circuit 104, and the timing of the sample hold circuit 108, and so forth.

The processing controller 110 switches the transmission/reception switch circuit 104 so that it may be connected to the transmission-side terminal T, to thereby carry out current application control of the loop coil selected by the selection circuit 101 among the X-axis direction loop coil group 23X or the Y-axis direction loop coil group 23Y, to thereby have the selected loop coil send out an electromagnetic wave. The resonant circuit of the pen 51 as the position indicator receives the electromagnetic wave sent out from the loop coil and stores energy.

Next, the processing controller 110 switches the transmission/reception switch circuit 104 so that it is connected to the reception-side terminal R. Thereafter, an induced voltage is generated across the respective loop coils of the X-axis direction loop coil group 23X and the Y-axis direction loop coil group 23Y by an electromagnetic wave transmitted from the pen 51 as the position indicator. Based on the level of the voltage values of the induced voltages generated across the respective loop coils, the processing controller 110 calculates the coordinate values of the indicated position in the X-axis direction and the Y-axis direction in the pen operation detection area of the second sensor substrate 23.

As shown in FIG. 1, a lead part 23L for connecting the above-described sensor circuit part to the external circuit (printed wiring board 30) is formed on the second sensor substrate 23.

Although not shown in FIG. 1, a sensor circuit part is provided also on the first sensor substrate 21 and a lead part for connecting the sensor circuit part to the external circuit (printed wiring board 30) is formed, as described above.

The magnetic path material 24 is provided under the second sensor substrate 23. The magnetic path material 24 has such predetermined permeability as to have no influence on DC magnetic flux due to a DC magnetic field like the geomagnetism, i.e., the magnetic path material 24 has transmissibility for the DC magnetic flux due to the DC magnetic field. Furthermore, the magnetic path material 24 forms a magnetic path for an alternating magnetic field generated by the coil of the second sensor substrate 23. Moreover, the magnetic path material 24 is composed of a material having a predetermined value of electrical resistance so that current flow in the magnetic path may be suppressed, in order to prevent deterioration of the performance as the magnetic path due to an eddy current generated by the alternating magnetic field, that is, in order to enhance the performance as the magnetic path. In this example, the magnetic path material 24 is composed of a material prepared by mixing powder of an amorphous metal of high permeability with a non-magnetic, non-conductive polymer material, for example. a resin, and solidifying the mixture.

As the material to form the magnetic path material 24, powder of permalloy or ferrite (iron oxide) can also be used instead of the powder of an amorphous metal. Furthermore, the polymer material is not limited to a resin and may be any of organic polymer materials and inorganic polymer materials. For example, as an organic polymer material, natural polymer material such as protein, nucleic acid, polysaccharide (cellulose, starch, etc.), and natural rubber and synthetic polymer material such as synthetic resin, silicon resin, synthetic fiber, and synthetic rubber can be used. Furthermore, as an inorganic polymer material, natural polymer material such as silicon dioxide (crystal, quartz), mica, feldspar, and asbestos and synthetic polymer material such as glass and synthetic ruby can be used.

The magnetic path material 24 configured in the above-described manner has lower permeability and higher electrical resistance compared with a magnetic path material composed only of a material of high permeability such as an amorphous metal, because powders of a material of high permeability such as an amorphous metal is mixed with a non-magnetic, non-conductive polymer material. Adjusting the mixture ratio between the powder of the material of high permeability such as an amorphous metal and the polymer material makes it possible to relatively easily form the magnetic path material 24 having such desired permeability as to have substantially no influence on DC magnetic flux due to a DC magnetic field such as the geomagnetism and such desired electrical resistance as to suppress current flow in the magnetic path material 24 in order to compensate for the magnetic path performance deteriorated in return for ensuring such desired permeability as to have substantially no influence on the DC magnetic flux due to the DC magnetic field such as the geomagnetism.

FIG. 5 shows the characteristics of the magnetic path plate 4 of Patent Document 1 described above and the magnetic path material 24 of this embodiment based on comparison therebetween. As shown in FIG. 5, the permeability of the magnetic path plate 4 of Patent Document 1 is as high as 10000 [H/m] and thus the performance as the magnetic path for the AC magnetic field is very high. However, it can be seen that the magnetic path plate 4, due to its high magnetic path performance, may possibly cause DC magnetic flux due to a DC magnetic field to be biased.

In contrast, the permeability of the magnetic path material 24 of the present embodiment is as low as 100 [H/m]. Therefore, DC magnetic flux due to a DC magnetic field such as the geomagnetism is not substantially affected by the magnetic path material 24 and thus there is no need to be concerned with any bias to the magnetic flux. Accordingly, even when a geomagnetic sensor is located near the outside of the position detecting device 20, magnetic flux of the geomagnetism is incident on the geomagnetic sensor in the original correct direction and, therefore, the geomagnetic sensor can correctly detect the orientation of the geomagnetism.

Furthermore, the electrical resistance of the magnetic path material 24 of this embodiment is significantly higher than that of the amorphous metal (about 0.1Ω) and has a value of 100 kΩ, for example. Thus, the eddy current generated due to an alternating magnetic field is greatly suppressed. Therefore, the alternating magnetic flux can avoid the influence of an eddy current. Thus, the magnetic path material 24 can form a favorable magnetic path although its permeability is low. Accordingly, the magnetic path material 24 has sufficient performance as the magnetic flux path for the alternating magnetic field generated by the coils 23X and 23Y of the second sensor substrate 23 and the alternating magnetic field received from the position indicator 51. This makes it possible to favorably maintain the sensor sensitivity of the position detecting device 20.

However, because a material of low permeability is used for the magnetic path material 24 of this embodiment, possibly part of the alternating magnetic field generated by the coils 23X and 23Y of the second sensor substrate 23 and the alternating magnetic field received from the position indicator 51 is transmitted (penetrates) through the magnetic path material 24 and leaks to the opposite side to the second sensor substrate 23. In this embodiment, such leakage of the alternating magnetic flux is blocked by disposing the shield material 25 on the side of the magnetic path material 24 (under the magnetic path material 24), which is opposite to the side of the magnetic path material 24 on which the second sensor substrate 23 is provided, and combining it with the magnetic path material 24.

The shield material 25 has transmissibility for DC magnetic flux due to a DC magnetic field such as the geomagnetism. Specifically, the shield material 25 is composed of a material that is a non-magnetic substance to allow passage of DC magnetic flux due to a DC magnetic field and has such high electrical conductivity that the electrical resistance is almost zero in order to generate an eddy current for an alternating magnetic field. In this example, the shield material 25 is composed of aluminum.

Specifically, the embodiment assumes the alternating magnetic flux that may have leaked from the magnetic path material 24 as allowable, and have the leaked alternating magnetic field to generate an eddy current in the shield material 25 having electrical conductivity, to thereby prevent the alternating magnetic field from being further leaked to the outside from the shield material 25. Due to this configuration, even when an alternating magnetic field leaked via the magnetic path material 24 exists, leakage of the field to the side of the shield material 25 is prevented, which is opposite to the side of the shield material on which the magnetic path material 24 is provided. Thus, the alternating magnetic field generated by the coils 23X and 23Y of the second sensor substrate 23 and the alternating magnetic flux due to the alternating magnetic field received from the position indicator 51 are prevented from leaking to the outside of the position detecting device, based on the configuration in which the magnetic path material 24 is combined with the shield material 25 in the embodiment of the present invention.

Furthermore, entry of electromagnetic noise from outside of the position detecting device 20 is prevented, due to an eddy current being generated in the shield material 25. The material of the shield material 25 is not limited to aluminum and magnesium alloy, stainless material (SUS), copper, and copper alloy (brass, etc.) can also be used.

In this embodiment, the shield material 25 is configured to serve also as a housing container for the above-described various components of the position detecting device 20. Therefore, the shield material 25 is formed into a box container shape that has a bottom part 25a as the part under the magnetic path material 24, and a wall part (sidewall part) 25b provided vertically from the peripheral edge of the bottom part 25a, for example.

In a recess space 25c surrounded by the wall part 25b of the shield material 25, the transparent electrode group 212 provided on the back surface of the transparent substrate 211 of the first sensor substrate 21, the LCD substrate 22, the second sensor substrate 23, and the magnetic path material 24 are so housed as to overlap with each other, as shown in FIG. 2. In other words, on the side of a second surface 23b of the second sensor substrate 23 as the coil substrate, which is opposite to a first surface 23a of the second sensor substrate 23 to which the position indicator 51 is opposed, the magnetic path material 24 and the shield material 25 are disposed in such a relationship that the magnetic path material 24 is disposed between the second surface 23b of the second sensor substrate 23 and the shield material 25.

A protrusion part 25d protruding toward the outside along the first surface 23a of the second sensor substrate 23 is formed at the end part of the wall part 25b of the shield material 25, on the side of the wall part 25b opposite to the side on which the bottom part 25a is provided. The protrusion part 25d is so formed as to be opposed to the above-described frame part 213 of the transparent substrate 211 of the first sensor substrate 21. The protrusion part 25d may be so formed as to protrude also toward the inside, depending on each application. Moreover, a predetermined number of notch parts 25f may be provided in the protrusion part 25d according to each application so as to accommodate the electronic circuit mounted at the peripheral part of the first sensor substrate 21.

In the state in which the transparent electrode group 212 of the first sensor substrate 21, the LCD substrate 22, the second sensor substrate 23, and the magnetic path material 24 are housed in the recess space 25c of the shield material 25, the frame part 213 of the transparent substrate 211 of the first sensor substrate 21 abuts against the protrusion part 25d of the shield material 25. Furthermore, in this embodiment, the frame part 213 of the transparent substrate 211 of the first sensor substrate 21 is bonded to the protrusion part 25d of the shield material 25 via an adhesive 26. Therefore, the opening part of the shield material 25 is closed by the transparent substrate 211 of the first sensor substrate 21.

The frame part 213 of the transparent substrate 211 of the first sensor substrate 21 and the protrusion part 25d of the shield material 25 are so configured as to have a predetermined abutting area that is sufficiently large for position fixing by the adhesive 26.

In the above-described manner, the position detecting device 20 is formed with the structure in which the transparent electrode group 212 of the first sensor substrate 21, the LCD substrate 22, the second sensor substrate 23, and the magnetic path material 24 are housed in the recess space 25c of the shield material 25 and the recess space 25c of the shield material 25 is closed by the transparent substrate 211 of the first sensor substrate 21. That is, the position detecting device 20 has a module structure in this example.

In this embodiment, in the bottom part 25a of the shield material 25 shown in FIG. 1 and FIG. 2, plural aperture parts (slits, not shown) are provided to pass flat cables for electrical connection of each of the LCD substrate 22 and the second sensor substrate 23.

In the example shown in FIG. 1 and FIG. 2, a connector 27a is connected to a connector 31a provided on the printed wiring board 30 to be described later, and is also connected to the lead part 22L of the LCD substrate 22 via the flat cable extending through the slit provided in the bottom part 25a of the shield material 25. Similarly, a connector 27b is connected to a connector 31b provided on the printed wiring board 30, and is also connected to the lead part 23L of the second sensor substrate 23 via the flat cable extending through another slit provided in the bottom part 25a of the shield material 25. Further, though not illustrated, a lead part is formed on the first substrate 21 to be electrically connected to a predetermined connector provided on the printed wiring board 30 similarly to the above-described electrical connection form.

On the printed wiring board 30, an integrated circuit (IC) 32 for the portable terminal, a geomagnetic sensor 33, other electronic parts, and a copper foil wiring pattern are provided in addition to the above-described plural connectors 31a, 31b, and so forth.

The chassis 40 is composed of a synthetic resin, for example. In the chassis 40, a recess part 41 and a step part 42 for housing the position detecting device 20 and the printed wiring board 30 are formed. As shown in FIG. 2, the recess part 41 has such depth and shape as to house the printed wiring board 30 on its bottom part and to house the part of the position detecting device 20 corresponding to the recess space 25c of the shield material 25.

The step part 42 has such depth and shape as to house the flange part formed by the frame part 213 of the first sensor substrate 21 and the protrusion part 25d of the shield material 25, which are bonded together by the adhesive 26 in the position detecting device 20.

In assembling the portable terminal 10, the printed wiring board 30 is housed in the recess part 41 of the chassis 40 in such a manner that the side of the printed wiring board 30 on which its connectors 31a, 31b, and so forth are formed is exposed. The printed wiring board 30 is then fixed to the bottom part of the recess part 41 of the chassis 40 by bonding or screw clamping, for example.

Next, the position detecting device 20 formed as a unit is housed in the recess part 41 of the chassis 40 in such a manner that the bottom part 25a of the shield material 25 is opposed to the printed wiring board 30, and the connectors 31a, 31b, and so forth provided on the printed wiring board 30 are connected to the connectors 27a, 27b, and so forth, respectively, provided in the position detecting device 20. At this time, the protrusion part 25d of the shield material 25 and the step part 42 of the chassis 40 are bonded to each other by an adhesive 28, for example, and as a result the position detecting device 20 is fixed to the chassis 40.

As shown in FIG. 2, in the state in which the position detecting device 20 and the printed wiring board 30 are housed in the chassis 40, the uppermost surface of the position detecting device 20 is substantially flush with a top surface 43 of the chassis 40. At this time, the top surface of the IC 32 provided on the printed wiring board 30 is in contact with the surface of the bottom part 25a of the shield material 25, as shown in FIG. 2. Aluminum used to form the shield material 25 in this embodiment has favorable thermal conductivity. Therefore, in this embodiment, the shield material 25 functions also as a heatsink material for the IC 32. It is also possible that the part of surface of the bottom part 25a of the shield material 25 opposed to the IC 32 is formed into a convex shape so that the surface of the shield material 25 may be in contact with the top surface of the IC 32. Furthermore, it is also possible to form a concave part in the surface of the bottom part 25a of the shield material 25, which matches the shape of the IC 32, to thereby allow the shield material 25 and the IC 32 to favorably come into contact with each other.

In the portable terminal 10 configured in the above-described manner, a material that has lower permeability compared with an amorphous metal and has high electrical resistance in order to suppress generation of an eddy current is employed. This allows for a position detecting device employing a combination of the magnetic path material 24, which ensures desired performance as a magnetic path for an AC magnetic field and has no influence on DC magnetic flux due to a DC magnetic field such as the geomagnetism (i.e., ensures transmissibility for DC magnetic flux due to a DC magnetic field), and the shield material 25, which ensures transmissibility for DC magnetic flux due to a DC magnetic field such as the geomagnetism and is composed of a highly-conductive material that is effective for generation of an eddy current. Therefore, bias to the direction of DC magnetic flux due to a DC magnetic field such as the geomagnetism is prevented even when the magnetic path material 24 exists. Thus, even when the position detecting device having the magnetic path material 24 is housed adjacent to the geomagnetic sensor 33 provided on the printed wiring board 30 of the portable terminal 10, the geomagnetic sensor can detect the correct orientation.

Moreover, the alternating magnetic field generated by the coil of the second sensor substrate 23 and the alternating magnetic field from the position indicator 51, received by the coil of the second sensor substrate 23, are blocked by the structure based on the combination of the magnetic path material 24 and the shield material 25 so that the alternating magnetic field is prevented from leaking to the outside of the position detecting device 20, as described above.

In addition, electromagnetic wave noise generated by the printed wiring board 30 and electromagnetic wave noise that enters from the outside of the portable terminal are also prevented from entering the inside of the position detecting device 20 due to the configuration of the position detecting device 20.

Furthermore, in the above-described embodiment, the shield material 25 serves also as a housing container for housing the various constituent elements of the position detecting device 20 and thus the configuration of the position detecting device 20 can be simplified. Moreover, as described above, the shield material 25 can be used also as a heatsink component for the electronic parts such as an IC disposed on the printed wiring board by utilizing the thermal conductivity of the shield material 25. As a result, a heat release effect is achieved in a high-density apparatus, such as a portable apparatus.

Second Embodiment

In the position detecting device 20 of the above-described first embodiment, the sensor of the electromagnetic induction system configured with the second sensor substrate 23 carries out switching between the transmission time (excitation time) and the reception time (time for detection of the induced magnetic field from the position indicator 51) in a time-division manner for each loop coil, to thereby allow detection of the position indicated by the position indicator 51.

In contrast, in the second embodiment, a coil for magnetic field transmission to the position indicator 51 (for excitation) and a coil for detection of the induced magnetic field from the position indicator 51 (for reception) are configured separately from each other.

Figure 6:
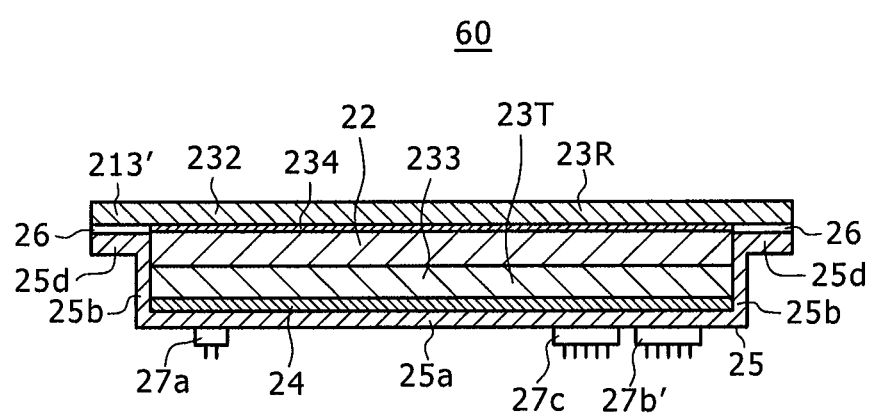
FIG. 6 is a sectional view for explaining a position detecting device of a second embodiment of the present invention.

FIG. 6 is a diagram for explaining the configuration of a position detecting device 60 of the second embodiment and corresponds to the sectional view of the position detecting device 20 of the first embodiment shown in FIG. 2. In FIG. 6, the same constituent part as that in the position detecting device 20 of the first embodiment is given the same numeral and detailed description thereof is omitted.

Specifically, in the second embodiment, instead of the first sensor substrate 21 having a configuration of a position detecting sensor of the capacitive system, a reception coil substrate 23R for receiving a signal transmitted from a position indicator in the electromagnetic induction system is provided. In the reception coil substrate 23R, a reception loop coil group 234 formed of an ITO film or the like is formed in a matrix manner on a transparent substrate 232 and a reception circuit part is provided at the peripheral part of the transparent substrate 232.

The LCD substrate 22 is provided under the reception coil substrate 23R. Under the LCD substrate 22, an excitation coil substrate 23T is provided to power feed a position indicator in the electromagnetic induction system by electromagnetic coupling. In the excitation coil substrate 23T, on a substrate 233, an excitation loop coil group (not shown) formed of a fine-line metal conductor is formed and an excitation circuit part is provided. Furthermore, in this example, a control circuit part that controls the reception circuit part and the excitation circuit part and controls operation of detecting the position indicated by the position indicator 51 is also provided on the excitation coil substrate 23T. It is also possible to provide the control circuit part on the reception coil substrate 23R.

In the second embodiment, the magnetic path material 24 is provided under the excitation coil substrate 23T. Furthermore, also in the second embodiment, in the housing space 25c of the shield material 25 serving also as a housing container, the reception coil substrate 23R having the reception loop coil group 234 on the back surface of the transparent substrate 232 for position detection in the electromagnetic induction system, the LCD substrate 22, the excitation coil substrate 23T to power feed the position indicator, and the magnetic path material 24 are so housed as to be sequentially stacked as shown in FIG. 6, similarly to the first embodiment.

In addition, similarly to the first embodiment, a frame part 213' of the transparent substrate 232 of the reception coil substrate 23R and the protrusion part 25d of the shield material 25 are bonded by the adhesive 26, so that the opening part of the shield material 25 is closed by the transparent substrate 232 of the reception coil substrate 23R. Therefore, the position detecting device 60 of the second embodiment may also be formed as a module. As described above, in the protrusion part 25d of the shield material 25, a predetermined number of notch parts 25f may be provided to accommodate the electronic circuit disposed at the periphery of the reception coil substrate 23R.

In FIG. 6, the connector 27a that is so provided as to protrude from the bottom part 25a of the shield material 25 toward the outside is connected to the lead part 22L of the LCD substrate 22, as described in connection with the first embodiment. A connector 27b' is connected to a lead part of the excitation coil substrate 23T using a similar connection form. Further similarly, a connector part 27c is connected to a lead part of the reception coil substrate 23R.

Also in the second embodiment, as with the first embodiment, the magnetic path material 24 and the shield material 25 have no influence on DC magnetic flux due to a DC magnetic field such as the geomagnetism and, thus, do not disturb orientation measurement by the geomagnetic sensor.

Furthermore, also in the second embodiment, the same advantageous effects as those of the first embodiment are achieved.

Third Embodiment

In the above-described first embodiment and second embodiment, the magnetic path material 24 is so provided as to cover only the bottom part 25a of the shield material 25 serving also as a housing container. However, providing the magnetic path material 24 also on the wall part 25b of the shield material 25 makes it possible to more effectively ensure a magnetic path for the alternating magnetic field generated from the second sensor substrate 23 or the excitation coil substrate 23T and the alternating magnetic field received by the second sensor substrate 23 or the reception coil substrate 23R from the position indicator 51. A third embodiment of the present invention has a configuration for further enhancing the characteristics of the magnetic path material 24 as a magnetic path.

In the above-described embodiments, as the magnetic path material 24, a material is used that is prepared by adding a resin to powder of a magnetic substance of high permeability, such as an amorphous metal or permalloy, and solidifying the mixture. However, as the magnetic path material 24, besides such solidified material, a material may be used that is prepared by mixing a polymer material with the powder of high permeability and is in a paint-like form.

In the third embodiment, as the magnetic path material, not a solidified material but a material in a paint-like form is used.

Figure 7:
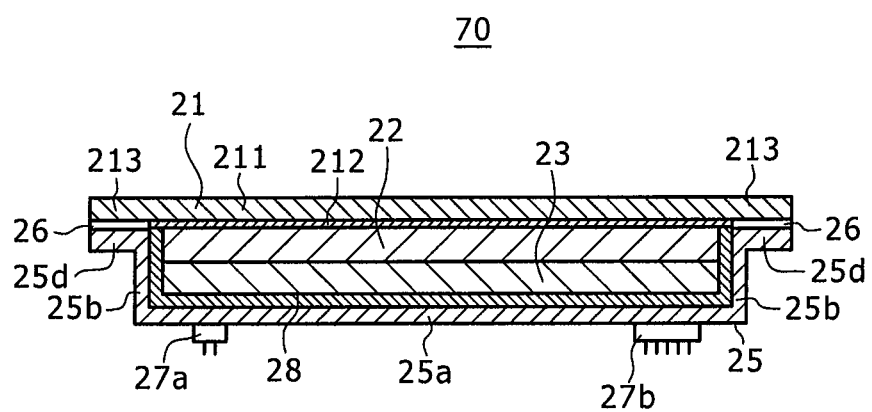
FIG. 7 is a sectional view for explaining a position detecting device of a third embodiment of the present invention.

FIG. 7 is a diagram for explaining the configuration of a position detecting device 70 of the third embodiment and corresponds to the sectional view of the position detecting device 20 of the first embodiment shown in FIG. 2. In FIG. 7, the same constituent part as that in the position detecting device 20 of the first embodiment is given the same numeral and detailed description thereof is omitted.

First, a magnetic path material 28 in the third embodiment is generated in a paint-like form through mixing of a polymer material such as resin powder with powder of an amorphous metal or permalloy, for example. Then, the magnetic path material 28 is allowed to be applied by painting.

Subsequently, the magnetic path material 28 generated in a paint-like form is applied not only onto the bottom part 25a of the shield material 25 but also over the entire inner surface including the inner wall part, as shown in FIG. 7. The other components are configured similarly as in the position detecting device 20 of the first embodiment.

According to the third embodiment, higher performance of the magnetic path material can be achieved by generating the magnetic path material 28 in a paint-like form and applying it over the entire inner surface of the shield material 25, i.e., by applying it also onto the wall part 25b of the shield material 25.

Fourth Embodiment

In the above-described first to third embodiments, a position detecting device of the electromagnetic induction system is used. Specifically, in this system, power is fed to a position indicator from the (sensing) electrodes of the sensor substrate by electromagnetic coupling and the position indicated by the position indicator is obtained also by using electromagnetic coupling.

However, embodiments of the present invention are not limited to such systems, and instead can be applied in electronic apparatuses in which power is fed to a position indicator from a designated power supply coil by electromagnetic coupling, which coil is provided separately from the sensing electrodes. A fourth embodiment of the present invention relates to an application to such a position detecting device.

Figure 8:
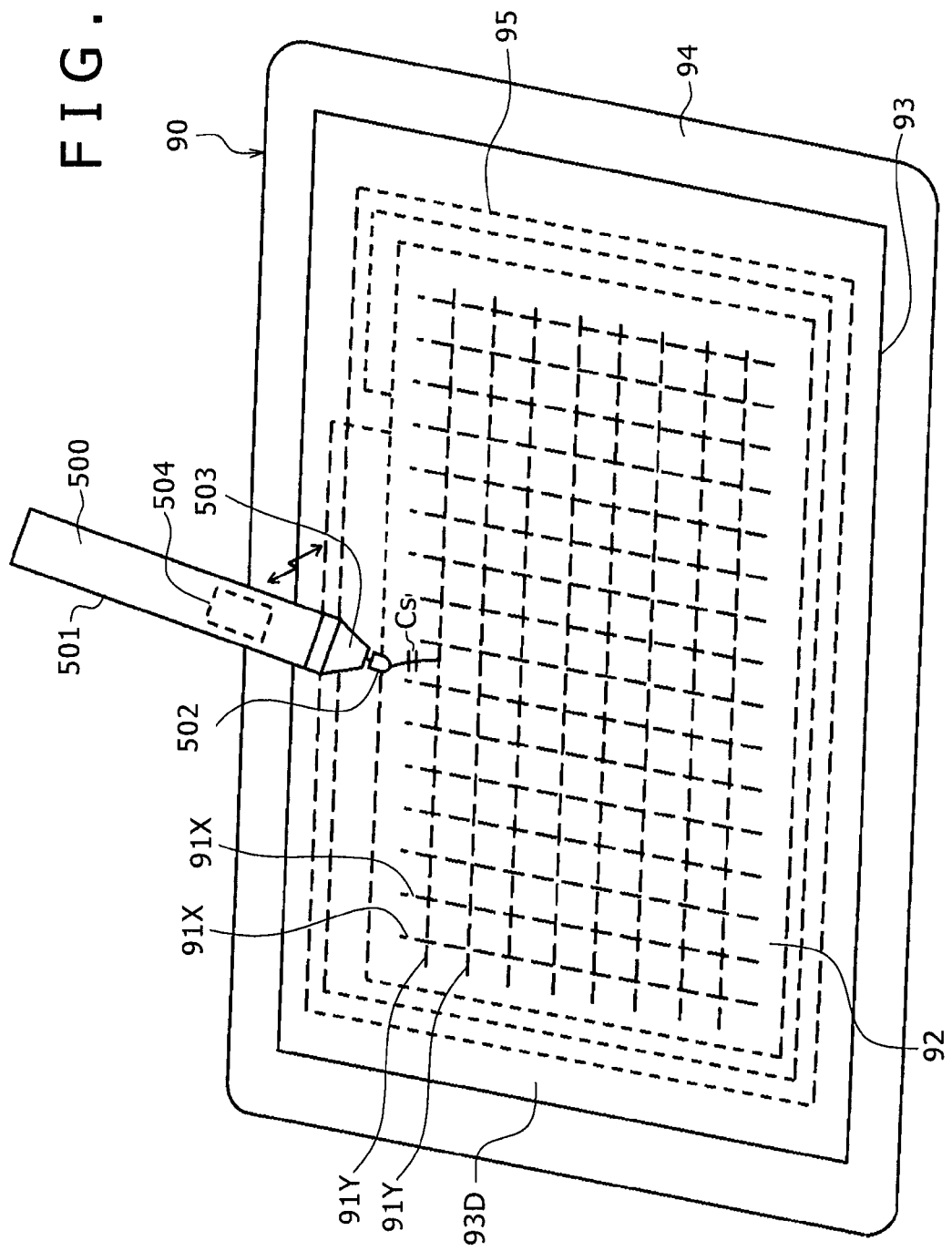
FIG. 8 is a diagram for explaining an example of a portable apparatus equipped with a position detecting device of a fourth embodiment of the present invention.

FIG. 8 is a diagram for explaining the outline of the configuration of a portable apparatus 90 including the position detecting device of the fourth embodiment and a position indicator 500 used together. A sensor substrate 92 of the position detecting device included in the portable apparatus 90 of the fourth embodiment and the position indicator 500 carry out detection of the indicated position based on the capacitive system.

Specifically, the sensor substrate 92 is provided on the back surface of the front surface part of the portable apparatus 90, on which a position is indicated by the position indicator 500. In the center area of the sensor substrate 92, plural line-shape transparent electrodes 91X and 91Y are so disposed as to be orthogonal to each other along the X direction and the Y direction, respectively, as shown in FIG. 3 for example. In addition, in the peripheral area of the sensor substrate 92, a power supply coil 95 is disposed as a component equivalent to the coil substrate of the present invention. The LCD substrate 22 is provided below the sensor substrate 92. Below the LCD substrate 22, the magnetic path material 24 and the shield material 25 are provided as the magnetic path for the power supply coil 95 and for electromagnetic shielding, respectively. A position detecting device 93 including the sensor substrate 92 for detecting a signal based on capacitive coupling with the position indicator 500 is housed in a chassis 94 of the portable apparatus 90.

The position detecting device 93 of the fourth embodiment has a configuration in which the magnetic path material 24 is combined with the shield material 25 similarly to the above-described embodiments. The magnetic path material 24 is housed in the shield material 25, which is serving also as a housing container, together with the LCD substrate 22. In FIG. 8, the sensor substrate 92 having the transparent electrode disposed in a matrix manner is disposed over a display screen 93D of the LCD included in the LCD substrate 22, similarly to the above-described embodiments.

The position indicator 500 includes a signal generator to be described later. In addition, it includes a conductor core 502 protruding from the tip of a case 501 and a tip conductor 503 electrically insulated from the conductor core 502. In the position indicator 500, an unbalanced signal voltage is applied between the conductor core 502 and the tip conductor 503, from the signal generator to be described later.

When the conductor core 502 of the position indicator 500 is brought close to or into contact with the input surface of the position detecting device 93 of the portable apparatus 90, capacitive coupling between the electrodes 91X and 91Y of the sensor substrate 92 and the conductor core 502 via capacitance Cs occurs. The capacitance Cs causes a change in the capacitance between the electrodes 91X and 91Y, and therefore a potential difference arises between the electrodes 91X and 91Y. Accordingly, the position indicated by the conductor core 502 of the position indicator 500 can be detected based on the position difference arising between the plural electrodes 91X and 91Y of the sensor substrate 92.

As described above, the position indicator 500 used together with the position detecting device 93 of the fourth embodiment has a function to transmit a signal from the signal generator and, thus, the power supply for this function is necessary. As the power supply, generally a battery is included as a drive power supply in the position indicator 500. However, the battery needs to be replaced when exhausted, which is troublesome. Furthermore, if a built-in battery is included in the position indicator, the weight of the position indicator increases, which possibly interferes with its operability.

In the fourth embodiment, the above-described problem relating to the power supply is solved by supplying power from the designated power supply coil on the position detecting device 93 of the portable apparatus 90 to the position indicator 500 by electromagnetic induction coupling.

In the fourth embodiment, on the sensor substrate 92 of the position detecting device 93 included in the portable apparatus 90, the power supply coil 95 is formed as the coil substrate of the present invention at the peripheral part of the sensor area of the sensor substrate, as shown in FIG. 8. The power supply coil 95 is a loop coil wound along a surface parallel to the display screen 93D of the portable apparatus 90, and may be implemented in the form of a printed wiring board having plural layers. An AC signal is supplied to the power supply coil 95 and an alternating magnetic field is generated in the direction perpendicular to the surface parallel to the display screen 93D, although not shown in the diagram. The circuit part for this purpose is formed on the sensor substrate 92 together with the sensor circuit part.

The position indicator 500 includes an electromagnetic coupling circuit 504, which receives the energy of the alternating magnetic field from the power supply coil 95, and a power storage circuit including a capacitor, which will be described below.

Therefore, when the position indicator 500 is brought close to the display screen 93D of the portable apparatus 90 while the AC signal is supplied to the power supply coil 95, an induced current is generated in the electromagnetic coupling circuit 504 of the position indicator 500 by the alternating magnetic field generated by the power supply coil 95. Based on the induced current, the capacitor of the power storage circuit is charged and power is stored, as will be described below. The position indicator 500 uses the stored power as the drive power supply.

Figure 9:
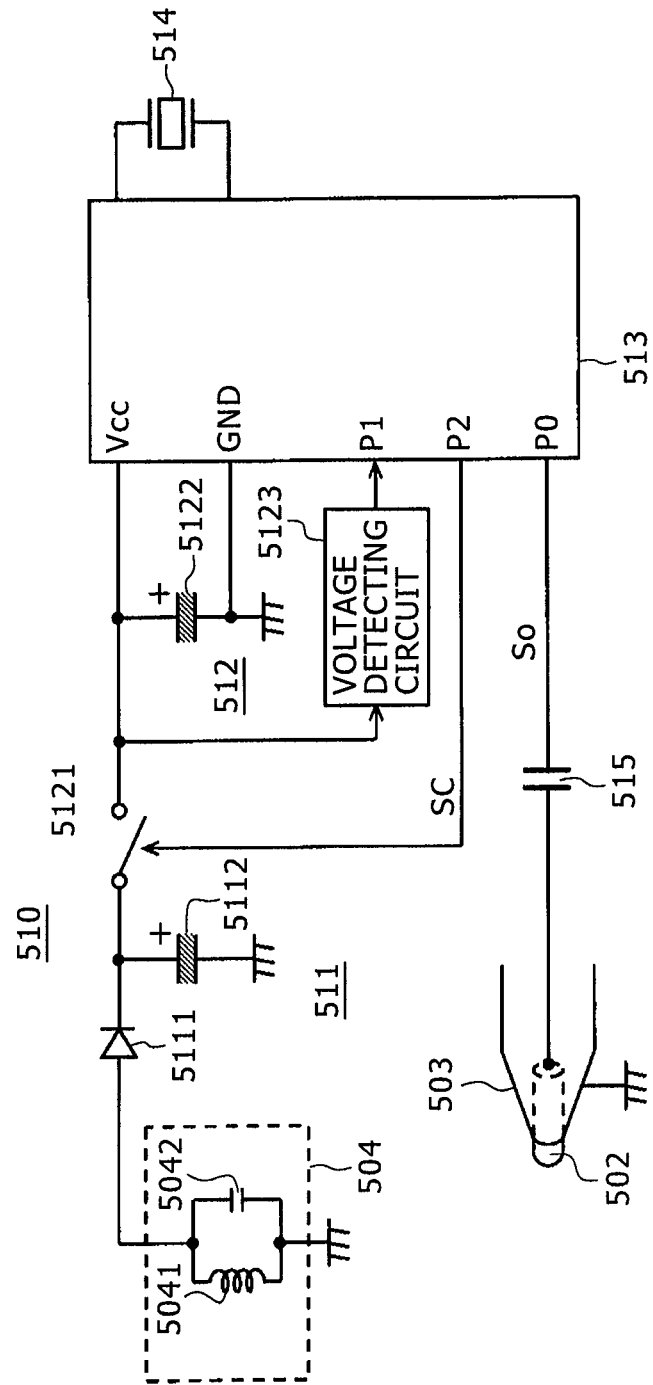
FIG. 9 is a circuit diagram for explaining a configuration example of a position indicator used together with the position detecting device of the fourth embodiment.
Figure 10:
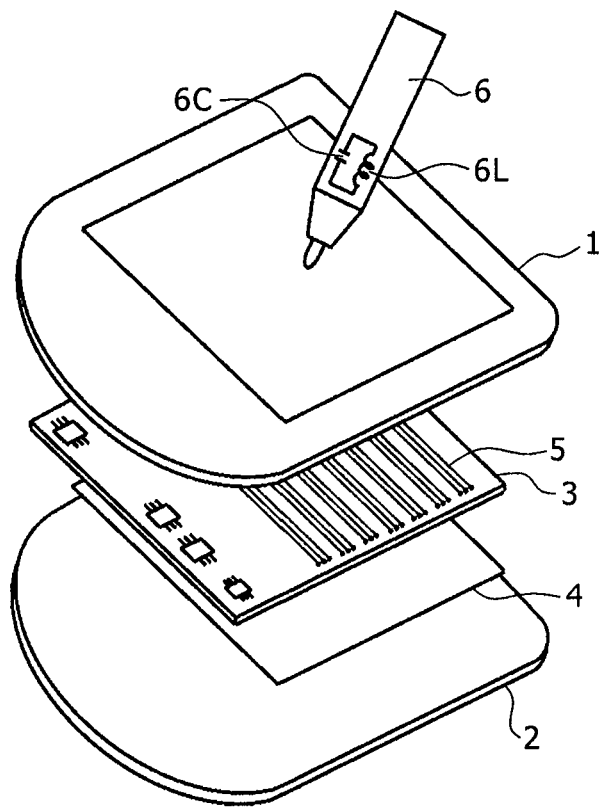
FIG. 10 is a diagram for explaining an example of a position detecting device of the related art.
Figure 11:
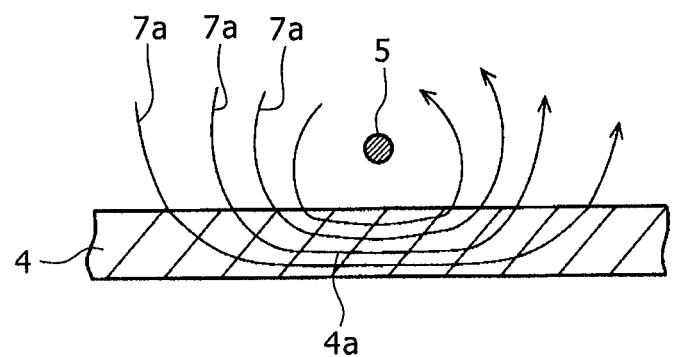
FIG. 11 is a diagram for explaining the example of the position detecting device of the related art.
Figure 12:
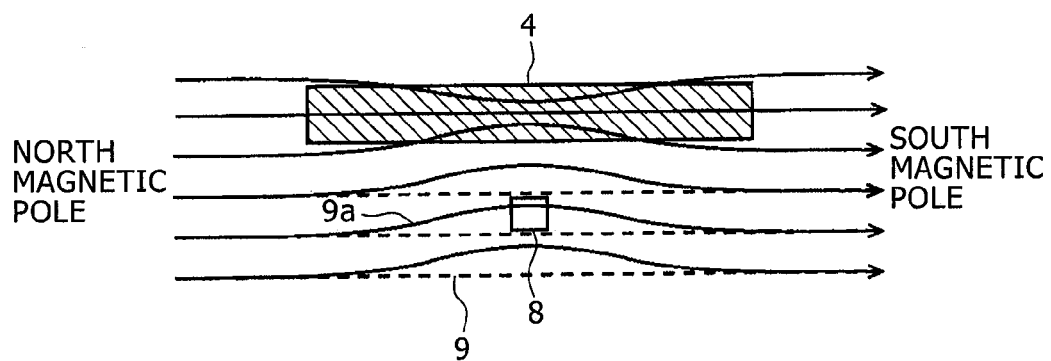
FIG. 12 is a diagram for explaining a problem associated with the example of the position detecting device of the related art.

FIG. 9 shows an example of an internal processing circuit 510 of the position indicator 500 of the fourth embodiment.

The internal processing circuit 510 is composed of the above-described electromagnetic coupling circuit 504, a power storage circuit 511, a regulated power supply circuit 512, and a controller 513. The controller 513 is formed of a microprocessor, for example. It has a voltage control function and has a function to generate and send out a transmission signal based on a clock signal generated by a crystal oscillator 514.

The electromagnetic coupling circuit 504 is formed of a resonant circuit composed of a coil 5041 and a capacitor 5042. The resonant frequency of the electromagnetic coupling circuit 504 is set equal to the frequency of the AC signal supplied to the power supply coil 95 of the position detecting device 93 of the portable apparatus 90. The electromagnetic coupling circuit 504 is positioned in the position indicator 500 so as to be capable of receiving an alternating magnetic field from the power supply coil 95 when the position indicator 500 is brought close to the portable apparatus 90, as shown in FIG. 8.

The power storage circuit 511 is composed of a rectification diode 5111 and a capacitor 5112 formed of an electric double-layer capacitor, for example.

The regulated power supply circuit 512 is composed of a switch 5121 formed of an field effect transistor (FET) for pulse width modulation (PWM) control, a regulation capacitor 5122, a voltage detecting circuit 5123, and the controller 513.

The electromagnetic coupling circuit 504 receives an alternating magnetic field from the power supply coil 95, to thereby resonate and generate an induced current. The induced current is rectified by the diode 5111 of the power storage circuit 511 and the capacitor 5112 is charged by the rectified signal.

In the above-described manner, in the fourth embodiment, the capacitor 5112 is charged and power is stored in the power storage circuit 511 when the position indicator 500 is brought close to the portable apparatus 90. The voltage held by the capacitor 5112 is supplied to the regulated power supply circuit 512.

In the regulated power supply circuit 512, the voltage held by the capacitor 5112 of the power storage circuit 511 is transferred to the voltage regulation capacitor 5122 in accordance with turning on/off of the switch 5121. The controller 513 supplies the switch 5121 with a rectangular wave signal SC of a certain cycle, with the duty ratio controlled as described later, as a switching signal. The switch 5121 is turned on/off by the rectangular wave signal SC to carry out PWM control of the voltage held by the capacitor 5112. Therefore, the voltage as the PWM control result is held in the voltage regulation capacitor 5122. The voltage held by the regulation capacitor 5122 is supplied to the controller 513 as its drive supply voltage.

The voltage detecting circuit 5123 detects the value of the voltage held by the voltage regulation capacitor 5122 and supplies the detection result to the controller 513. In accordance with the detection result of the voltage detecting circuit 5123, the controller 513 controls the duty ratio of the rectangular wave signal SC supplied to the switch 5121 so that the supply voltage may be set to a preset voltage+Vcc.

In the above-described manner, the supply voltage+Vcc regulated by the regulation power supply circuit 512 is supplied to the controller 513. The controller 513 supplies a transmission signal So of a predetermined frequency, which is generated by use of the clock signal from the crystal oscillator 514, to the conductor core 502 of the position indicator 500 via a capacitor 515. As a result, an unbalanced signal voltage supplied between the conductor core 502 and the tip conductor 503 of the position indicator 500 acts between the electrodes 91X and 91Y of the sensor substrate 92 of the position detecting device 93.

In the position detecting device 93, as described above, the position indicated by the conductor core 502 of the position indicator 500 is detected based on the potential difference arising between the plural electrodes 91X and 91Y of the sensor substrate 92 based on the applied unbalanced signal voltage.

In the position detecting device 93 of the fourth embodiment, the magnetic path material 24 effectively forms a magnetic path for the alternating magnetic field, which is generated by the power supply coil 95 for supplying power to the position indicator 500 through electromagnetic coupling with the electromagnetic coupling circuit 504 provided in the position indicator 500. Furthermore, the shield material 25 functions to prevent the alternating magnetic field from leaking to the outside of the position detecting device 93 housed in the portable apparatus 90.

Still further, according to the position detecting device 93 of the fourth embodiment, it is possible to prevent the direction of the geomagnetism that should be detected by the geomagnetic sensor provided in the portable apparatus 90 from being biased due to the magnetic path material 24, and thus the orientation can be correctly detected by the geomagnetic sensor.

Other Embodiments and Modification Examples

The configurations of the sensor parts of the above-described position detecting devices are examples only, and other configurations are equally possible.

Furthermore, in the above-described embodiments, though an LCD is used as a display device, the display device is not limited to an LCD and may be any other flat display device. For example, an organic EL display device may also be used.

Moreover, in the above-described embodiments, all of the position detecting devices included in the portable apparatuses have a display device. However, the display device is not essential and an embodiment of the present invention can be applied also in a position detecting device that does not include any display device.

In addition, in the above-described embodiments, the shield material is used to also serve as a housing container to house the coil substrate and so forth. However, this arrangement is not essential, and it is also possible to employ a configuration in which the shield material has a flat plate shape and is housed in a separate housing container, together with the coil substrate and so forth.

Furthermore, the portable apparatus is not limited to a portable terminal. An embodiment of the present invention can be applied in any type of apparatus as long as it is an electronic apparatus, which has a function to generate magnetic flux for electromagnetic coupling in a position detecting device and includes a magnetic sensor for detecting the geomagnetism, for example.

It should be understood by those skilled in the art that various modifications, combinations, sub-combinations and alterations may occur depending on design requirements and other factors insofar as they are within the scope of the appended claims or the equivalents thereof. Specifically, the various embodiments described above can be combined to provide further embodiments. All of the U.S. and foreign patents, patent applications and patent publications referred to in the specification are incorporated herein by reference, in their entirety. Aspects of the embodiments can be modified, if necessary to employ concepts of the various patents, applications and publications to provide yet further embodiments.

The invention claimed is:

1. A position detecting device used together with a position indicator, the position detecting device comprising:
a coil substrate including a coil for generating an alternating magnetic field for electromagnetic coupling with the position indicator;
a geomagnetic sensor;
a magnetic path material composed of a material having a permeability, which is one or more orders of magnitude smaller than a permeability of an amorphous metal material $\mu \approx 10{,}000$ so that the magnetic path material does not disturb a direct current magnetic flux of a geomagnetic field to be detected by the geomagnetic sensor while forming a magnetic path for the alternating magnetic field generated by the coil, the material forming the magnetic path material also having an electrical resistance that is one or more orders of magnitude greater than a resistance of the amorphous metal material of approximately $0.1\Omega$ so that the magnetic path material suppresses flow of an eddy current due to the alternating magnetic field generated by the coil;
wherein the magnetic path material is disposed on or near a second surface of the coil substrate, which is opposite to a first surface of the coil substrate to which the position indicator is opposed; and
a shield material disposed such that the magnetic path material is disposed between the shield material and the second surface of the coil substrate, the shield material being formed of a non-magnetic substance so as not to disturb the direct current magnetic flux of the geomagnetic field and having electrical conductivity for generating an eddy current based on entry of electromagnetic noise.

2. The position detecting device according to claim 1, wherein,
the magnetic path material is a mixture material obtained by mixing a material having high permeability with a polymer material that is added to set the permeability to a determined value.

3. The position detecting device according to claim 2, wherein,
the polymer material is one selected from the group consisting of a resin, rubber, and fiber material.

4. The position detecting device according to claim 1, wherein,
the magnetic path material is applied on the second surface of the coil substrate.

5. The position detecting device according to claim 1, wherein,
the shield material includes a wall part for housing the coil substrate and the magnetic path material.

6. The position detecting device according to claim 5, wherein,
the magnetic path material is disposed on the wall part of the shield material.

7. The position detecting device according to claim 1, wherein,
a display device is disposed on or near the first surface of the coil substrate.

8. The position detecting device according to claim 1, wherein, the position indicator includes a coil for electromagnetic coupling with the coil substrate, and
the coil substrate further comprises a reception coil for receiving a signal discharged from the coil included in the position indicator.

9. The position detecting device according to claim 8, wherein,
the reception coil is the same as the coil for generating the alternating magnetic field, which is shared in a time-division manner to generate the alternating magnetic field and to receive the signal discharged from the coil included in the position indicator.

10. The position detecting device according to claim 7, wherein,
the position indicator includes a coil for electromagnetic coupling with the coil substrate, and
the display device comprises a sensor pattern including a sensor electrode having transparency for receiving a signal discharged from the coil included in the position indicator.

11. The position detecting device according to claim 7, wherein,
the display device comprises a sensor pattern including a sensor electrode having transparency for detecting a position indicated by a pointer as a change in capacitance in the sensor pattern.

12. The position detecting device according to claim 11, wherein,
The pointer has a pen shape and includes a signal generating circuit that generates a signal for causing a change in capacitance in the sensor pattern, a coil for electromagnetic coupling with the coil substrate, and a power supply circuit that generates a drive voltage for driving the signal generating circuit based on a voltage induced in the coil for electromagnetic coupling with the coil substrate.

13. The position detecting device according to claim 5, wherein,
the wall part of the shield material includes a protrusion part for attaching the shield material, in which the coil substrate and the magnetic path material are housed, to another element.

14. The position detecting device according to claim 13, wherein,
the protrusion part has a determined area, which is to be fixed to the another element by an adhesive material, and which extends along the first surface of the coil substrate to which the position indicator is opposed.

15. A display apparatus used together with a position indicator, the display apparatus comprising:
a coil substrate including a coil for generating an alternating magnetic field for electromagnetic coupling with the position indicator;
a geomagnetic sensor;
a display device disposed on or near a first surface of the coil substrate, to which the position indicator is opposed; and
a magnetic path material composed of a material having a permeability, which is one or more orders of magnitude smaller than a permeability of an amorphous metal material $\mu \approx 10{,}000$ so that the magnetic path material does not disturb a direct current magnetic flux of a geomagnetic field to be detected by the geomagnetic sensor while forming a magnetic path for the alternating magnetic field generated by the coil, the material forming the magnetic path material also having an electrical resistance that is one or more orders of magnitude greater than a resistance of the amorphous metal material of approximately 0.1Ω so that the magnetic path material suppresses flow of an eddy current generated due to the alternating magnetic field generated by the coil;

wherein the magnetic path material is disposed on or near a second surface of the coil substrate, which is opposite to the first surface of the coil substrate; and a shield material disposed such that the magnetic path material is disposed between the shield material and the second surface of the coil substrate, the shield material being formed of a non-magnetic substance so as not to disturb the direct current magnetic flux of the geomagnetic field and having electrical conductivity for generating an eddy current based on entry of electromagnetic noise.

16. The display apparatus according to claim 15, wherein, the magnetic path material is a mixture material obtained by mixing a material having high permeability with a polymer material that is added to set the permeability to a determined value.

17. The display apparatus according to claim 15, wherein, the magnetic path material is applied on the second surface of the coil substrate.

18. A portable apparatus used together with a position indicator, the portable apparatus comprising:
a geomagnetic sensor;
a coil substrate including a coil for generating an alternating magnetic field for electromagnetic coupling with the position indicator;
a display device disposed on or near a first surface of the coil substrate, to which the position indicator is opposed; and
a magnetic path material composed of a material having a permeability, which is one or more orders of magnitude smaller than a permeability of an amorphous metal material $\mu \approx 10{,}000$ so that the magnetic path material does not disturb a direct current magnetic flux of a geomagnetic field to be detected by the geomagnetic sensor while forming a magnetic path for the alternating magnetic field generated by the coil, the material forming the magnetic path material also having an electrical resistance that is one or more orders of magnitude greater than a resistance of the amorphous metal material of approximately 0.1Ω so that the magnetic path material suppresses flow of an eddy current generated due to the alternating magnetic field generated by the coil;

wherein the magnetic path material is disposed on or near a second surface of the coil substrate, which is opposite to the first surface of the coil substrate; and a shield material disposed such that the magnetic path material is disposed between the shield material and the second surface of the coil substrate, the shield material being formed of a non-magnetic substance so as not to disturb the direct current magnetic flux of the geomagnetic field and having electrical conductivity for generating an eddy current based on entry of electromagnetic noise.

19. The portable apparatus according to claim 18, wherein, the magnetic path material is applied on the second surface of the coil substrate.

20. The position detecting device according to claim 1, wherein, the magnetic path material is formed of a material having determined permeability and a polymer material.

21. The display apparatus according to claim 15, wherein, the magnetic path material is formed of a material having determined permeability and a polymer material.

22. The portable apparatus according to claim 18, wherein, the magnetic path material is a mixture material obtained by mixing a material having high permeability with a polymer material that is added to set the permeability to a determined value.

23. The portable apparatus according to claim 18, wherein, the magnetic path material is formed of a material having determined permeability and a polymer material.

24. The position detecting device according to claim 1, wherein the magnetic path material is applied on the shield material.

25. The position detecting device according to claim 1, wherein the magnetic path material is in powder form.

26. The position detecting device according to claim 1, wherein the shield material is configured as a housing container for the position detecting device.

27. The position detecting device according to claim 1, wherein the coil substrate, the magnetic path material, and the shield material are disposed in a housing container for the position detecting device.

28. The position detecting device according to claim 1, wherein the shield material is selected from a group consisting of aluminum, magnesium alloy, stainless material, copper, and copper alloy.

29. The position detecting device according to claim 1, wherein the magnetic path material is fixed to the shield material by an adhesive material.

30. The position detecting device according to claim 11, wherein the pointer is a finger.

31. The display apparatus according to claim 15, wherein the magnetic path material is applied on the shield material.

32. The display apparatus according to claim 15, wherein the magnetic path material is in powder form.

33. The display apparatus according to claim 15, wherein the shield material is configured as a housing container for the display apparatus.

34. The display apparatus according to claim 15, wherein the coil substrate, the magnetic path material, and the shield material are disposed in a housing container for the display apparatus.

35. The display apparatus according to claim 15, wherein the shield material is selected from a group consisting of aluminum, magnesium alloy, stainless material, copper, and copper alloy.

36. The display apparatus according to claim 15, wherein the magnetic path material is fixed to the shield material by an adhesive material.

37. The portable apparatus according to claim 18, wherein the magnetic path material is applied on the shield material.

38. The portable apparatus according to claim 18, wherein the magnetic path material is in powder form.

39. The portable apparatus according to claim 18, wherein the shield material is configured as a housing container for the portable apparatus.

40. The portable apparatus according to claim 18, wherein the coil substrate, the magnetic path material, and the shield material are disposed in a housing container for the portable apparatus.

41. The portable apparatus according to claim 18, wherein the shield material is selected from a group consisting of aluminum, magnesium alloy, stainless material, copper, and copper alloy.

42. The portable apparatus according to claim 18, wherein the magnetic path material is fixed to the shield material by an adhesive material.

* * * * *